(12) United States Patent
Hajiri et al.

(10) Patent No.: US 8,505,993 B2
(45) Date of Patent: Aug. 13, 2013

(54) VEHICLE INTERIOR MEMBER

(75) Inventors: Miyuki Hajiri, Tokyo (JP); Hiroshi Kawai, Tokyo (JP); Syun Yoshida, Tokyo (JP)

(73) Assignee: Kumi Kasei Co., Ltd. (JP)

( * ) Notice: Subject to any disclaimer, the term of this patent is extended or adjusted under 35 U.S.C. 154(b) by 206 days.

(21) Appl. No.: 12/984,503

(22) Filed: Jan. 4, 2011

(65) Prior Publication Data
US 2012/0001445 A1 Jan. 5, 2012

(30) Foreign Application Priority Data
Jun. 30, 2010 (JP) .................................. 2010-149735

(51) Int. Cl.
*B60R 13/02* (2006.01)
(52) U.S. Cl.
USPC ........................ 296/1.08; 296/39.1

(58) Field of Classification Search
USPC .............................................. 296/1.08, 39.1
See application file for complete search history.

(56) References Cited

U.S. PATENT DOCUMENTS

| | | | |
|---|---|---|---|
| 6,908,144 B2 * | 6/2005 | Gotzinger et al. | 296/187.05 |
| 2010/0295329 A1 * | 11/2010 | Sapak et al. | 296/1.08 |

FOREIGN PATENT DOCUMENTS

JP 2008-149896 7/2008

* cited by examiner

*Primary Examiner* — Joseph Pape
(74) *Attorney, Agent, or Firm* — Kolisch Hartwell, P.C.

(57) ABSTRACT

A vehicle interior member that is attached to an interior side of a vehicle body, including an interior member body which is made of an unwoven fabric and exposed to the interior side; and a reinforcement band which is made of a rigid plastic and attached to a behind surface of the interior member body, the reinforcement band being provided with a locking mechanism that fixes the interior member body to the vehicle body.

7 Claims, 7 Drawing Sheets

VEHICLE INTERIOR MEMBER

CROSS-REFERENCE TO RELATED APPLICATIONS

The benefit of priority under 35 U.S.C. §119(a) is claimed to Japanese Patent Application No. 2010-149735, filed Jun. 30, 2010, the contents of which are incorporated herein by reference.

FIELD OF THE INVENTION

The present invention relates to a vehicle interior member attached to an interior side of the vehicle body.

BACKGROUND

Vehicle interior members are generally configured by entirely using a rigid plastic, or by applying a flexible member to a surface of a base member made of a rigid plastic, as disclosed in Japanese Unexamined Patent Application, First Publication No. 2008-149896.

These vehicle interior members of the related art, however, are not desirable for reducing the vehicle weight, because the vehicle interior members consist almost entirely of a rigid plastic.

Meanwhile, unwoven fabrics, such as plastic felts, are used as vehicle interior members for obtaining an excellent texture and reducing the vehicle weight. However, since the unwoven fabrics do not have a sufficient surface stiffness, the unwoven fabrics are usually attached to the vehicle body with the following methods (1), (2) or the like.

Method (1):

Attaching a base member made of a rigid plastic on which an unwoven fabric is applied, to an applied portion of the vehicle body.

Method (2):

Preparing a flat attachment plane at an applied portion of the vehicle body, providing an unwoven fabric on the flat attachment plane, and fixing the unwoven fabric by using a fixing tool such as a clip inserted from the aesthetic surface of the product.

However, if the method (1) is employed, the vehicle weight is not sufficiently reduced due to the weight of the base member on which the unwoven fabric is applied.

Further, if the method (2) is employed, it is difficult to prepare a sufficient area of the flat attachment plane at the vehicle body, and to obtain a stiffness of the unwoven fabric in an area around the fixing tool. In addition, a head portion of the inserted clip or the like exposes to the interior side, thereby deteriorating the appearance of the vehicle interior. Thus, the vehicle design and the portion to which the vehicle interior member can be attached are limited.

The present invention has been made in view of the above circumstances, and therefore an object of the present invention is to provide a vehicle interior member which is capable of reducing the vehicle weight by using unwoven fabrics, without limiting the vehicle design and the portion to which the vehicle interior member can be attached.

SUMMARY OF THE INVENTION

The vehicle interior member according to the present invention employs the following configurations for solving the above problems.

(1) A first aspect of the present invention is a vehicle interior member that is attached to an interior side of a vehicle body, including: an interior member body which is made of an unwoven fabric and exposed to the interior side; and a reinforcement band which is made of a rigid plastic and attached to a behind surface of the interior member body, the reinforcement band being provided with a locking mechanism that fixes the interior member body to the vehicle body.

(2) In the vehicle interior member described in (2), at least a part of the reinforcement band may be attached to the behind surface of the interior member body along an end portion of the interior member body.

(3) In the vehicle interior member described in (2), the interior member body may have a three-dimensionally curved surface that is three-dimensionally bent or curved near the end portion of the interior member body; and the reinforcement band may be attached to the behind surface of the interior member body along the three-dimensionally curved surface.

(4) In the vehicle interior member described in (1), the reinforcement band may be a plurality of reinforcement pieces.

(5) In the vehicle interior member described in (4), the reinforcement pieces may be arranged at a flat portion of the lining body.

(6) In the vehicle interior member described in (1), the reinforcement band may be continuously formed.

(7) In the vehicle interior member described in (1), the locking mechanism may be a clip base that holds a clip attached to the vehicle body.

(8) In the vehicle interior member described in (1), the reinforcement band may be provided with a positioning-fitting portion to which another member is attached.

DETAILED DESCRIPTION OF PREFERRED EMBODIMENTS

Referring now to the accompanying drawings, a description will be given of preferred embodiments of the present invention. In the following description, if no specific explanation is given, the upper/lower direction and the front/rear direction means these directions with respect to the vehicle body. Further, a front surface means a surface visible from a vehicle interior side, and a behind surface means a surface invisible from the vehicle interior side.

(First Embodiment)

A first embodiment of the present invention will be described with reference to FIGS. 1-5.

Figure 1:
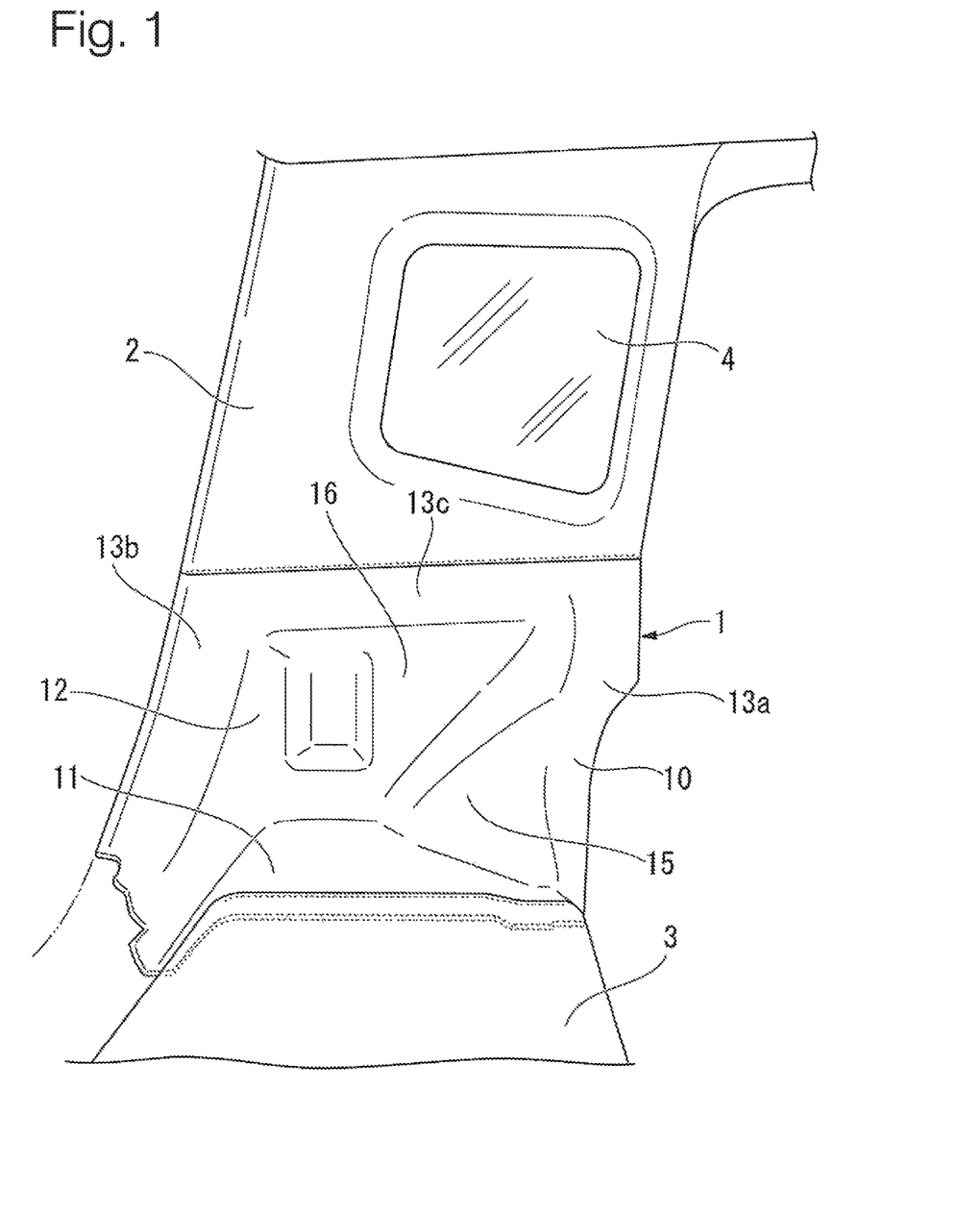
FIG. 1 is an external view of an interior side of a vehicle including a vehicle interior member according to a first embodiment of the present invention.

FIG. 1 shows a side of a vehicle trunk room, including a trunk side lining 1 (vehicle interior member), a pillar garnish 2 made of a plastic that covers an interior-side surface of a rear pillar (not shown), a trunk floor 3, and a rear side glass 4 installed in the rear pillar. The rear pillar garnish 2 is entirely made of a rigid plastic having a shape following the shape of the rear pillar.

Figure 2:
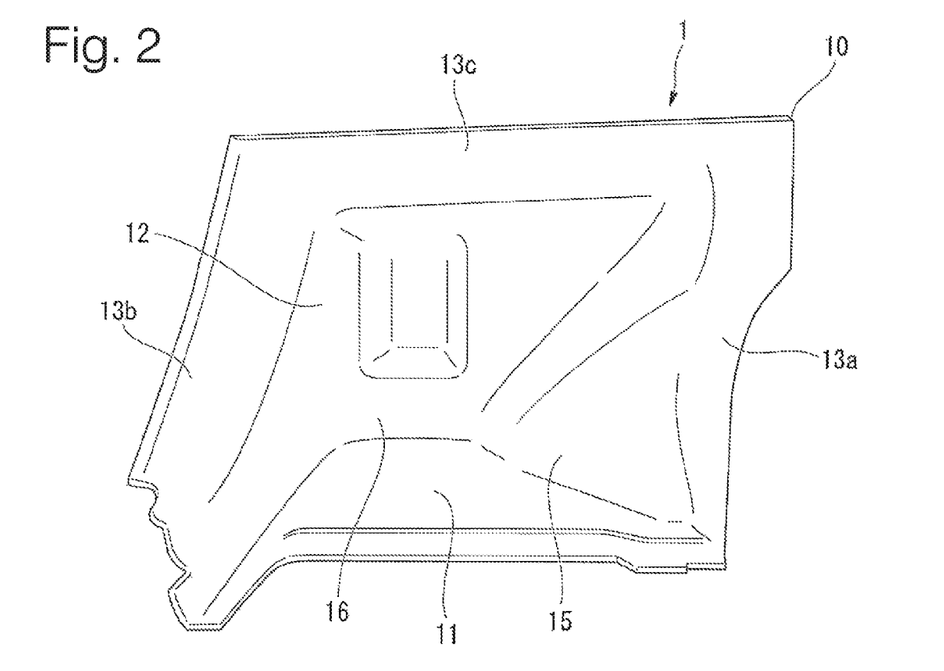
FIG. 2 is a perspective view of a front surface of the vehicle interior member.
Figure 3:
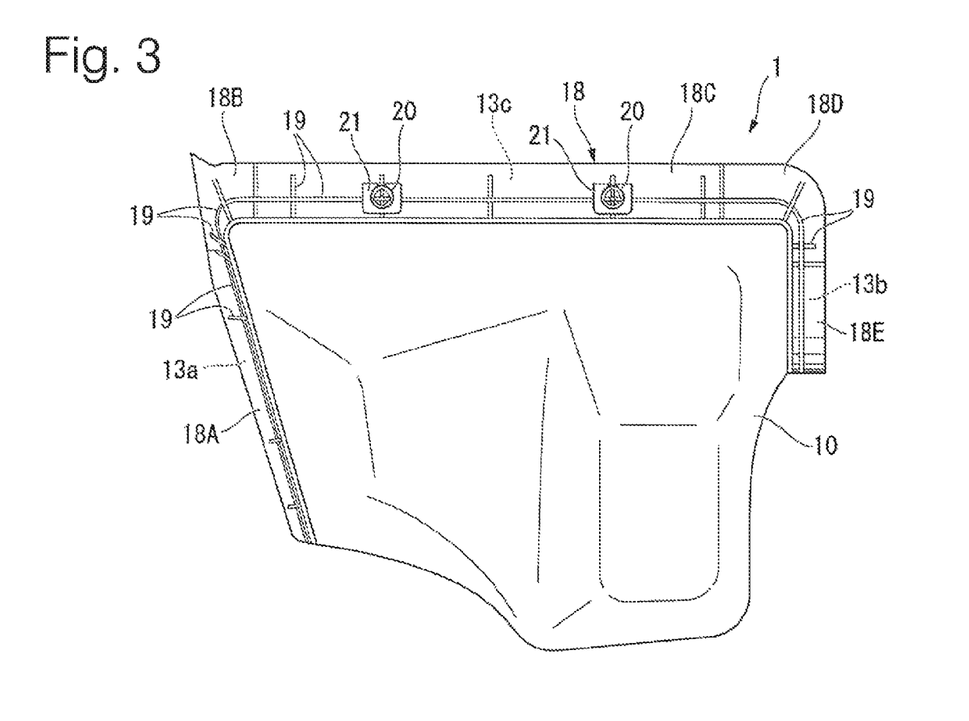
FIG. 3 is a perspective view of a behind surface of the vehicle interior member.

FIG. 2 shows a front surface of the trunk side lining 1 when viewed from an interior side of the vehicle, and FIG. 3 shows a behind surface of the trunk side lining 1.

The trunk side lining 1 includes, at the interior side, a lining body 10 (interior part body) which is entirely formed by an unwoven fabric (i.e., plastic felt). In this embodiment, the lining body 10 is produced by forming an unwoven fabric into the specific shape, by means of press forming.

The lining body 10 includes a bottom wall 11 which is horizontally arranged, and a side wall 12 which projects toward a vehicle body panel (not shown), both being continuously formed. Further, the lining body 10 includes a front end flange 13a, a rear end flange 13b, and an upper end flange 13c which are respectively provided at a front end, a rear end, and an upper end of the side wall 12.

The upper end flange 13c extends toward the front-rear directions of the vehicle along the interior-side surface of the rear pillar garnish 2. The front end flange 13a and the rear end flange 13b are respectively curved from an upper end area near the upper end flange 13c to a lower end area that comes close to the vehicle interior side. Meanwhile, as shown in FIG. 1 and FIG. 2, the lining body 10 includes a first deformed portion 15 (expanded portion) which has a shape following a shape of a rear wheel housing (not shown), and a second deformed portion 16 (concave portion) which is provided at a center region of the side wall 12. The front end flange 13a and the rear end flange 13b are three-dimensionally curved as shown in FIG. 2. Further, the front flange 13a, the rear flange 13b, and the upper end flange may be three dimensionally bent near each continuously connecting portion that connects the flanges 13a or 13b with the upper end flange 13c. In this embodiment, a three-dimensionally curved surface is configured near the front end flange 13a, the rear end flange 13b, and the continuously connecting portions.

Further, as shown in FIG. 3, the behind surface of the lining body 10 has a reinforcement band 18 provided along the front end flange 13a, the upper end flange 13c, and the rear end flange 13b. This reinforcement band has a substantially constant width and is made of a rigid plastic (i.e., polypropylene, ABS, polyethylene, chloroethylene, PET, polycarbonate, polystyrene, POM, and the like). In this embodiment, the reinforcement band 18 is not continuously formed, but is configured by a plurality of reinforcement pieces 18A, 18B, 18C, 18D, and 18D.

The reinforcement pieces 18A, 18C, and 18E are formed along behind surface shapes of the front end flange 13a, the upper end flange 13c, and the rear end flange 13b. Further, the reinforcement pieces 18B and 18D are respectively formed along behind surface shapes of the continuously connecting portion that connects the front end flange 13a with the upper end flange 13c, and the continuously connecting portion that connects the rear end flange 13b with the upper end flange 13c. In this embodiment, the reinforcement pieces 18A, 18B, 18C, 18D, and 18 E are respectively separated at portions corresponding to flat portions that do not cross over the bent portion or the curved portion of the lining body 10. That is, the reinforcement pieces 18A, 18B, 18C, 18D, and 18 E are arranged at flat portions of the lining body 10.

The reinforcement pieces 18A, 18B, 18C, 18D, and 18 E are provided on the behind surfaces of the corresponding flanges 13a, 13b, and 13c of the lining body 10, and are continuously attached thereto by means of an ultrasonic welding process.

The reinforcement pieces 18A, 18B, 18C, 18D, 18E that configure the reinforcement band 18 has a plurality of ribs 19 on the behind surface for improving the bending stiffness thereof. Further, on the behind surface of the reinforcement band 18 (on the behind surfaces of the reinforcement pieces 18C, in the example shown in FIG. 3), a clip base 21 (a locking mechanism) that holds a clip 20 for fixing the trunk side lining 1 to the vehicle body is provided.

Figure 4:
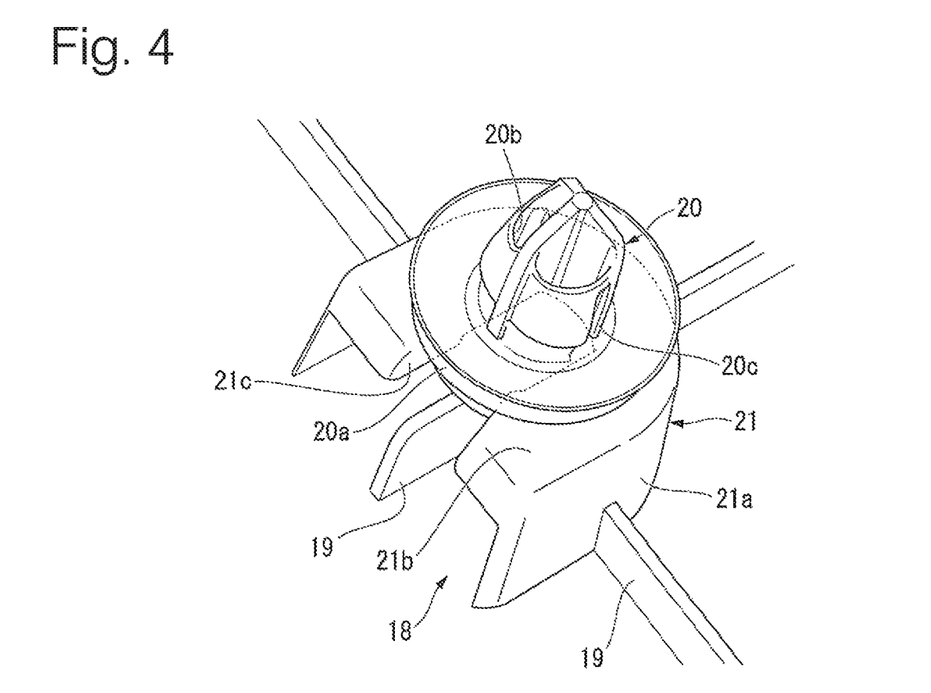
FIG. 4 is a partially enlarged perspective view of a clip base of the vehicle interior member.
Figure 5:
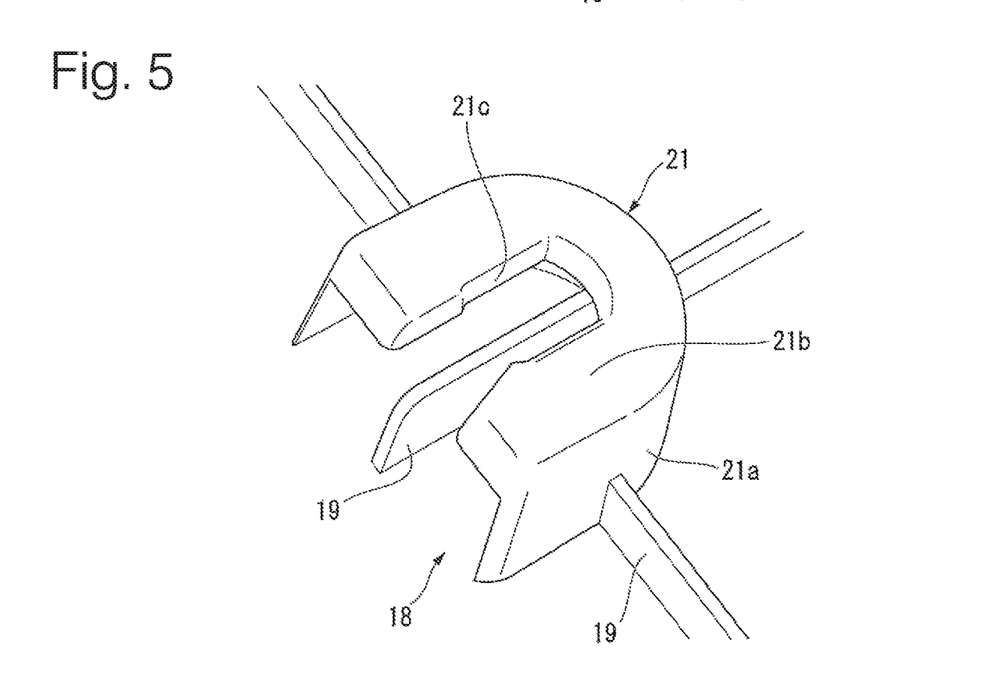
FIG. 5 is a partially enlarged perspective view of the clip base with a clip.

FIG. 4 shows a clip base 21 and a clip 20 attached thereto, and FIG. 5 shows the clip base 21 without the clip 20.

The clip 20 has a head portion 20a that is held by the clip base 21, and a leg portion 20b that is inserted into an attachment hole (not shown) of the vehicle body. The leg portion 20b includes a fixing portion 20c that prevents the clip from being detached from the attachment hole. Meanwhile, the head portion 20a includes a circular groove (not shown) to which the clip base 21 is fixed.

The clip base 21 includes a substantially U-shaped side wall 21a rising from the behind surface of the reinforcement band 18, and an upper wall 21b continuously provided on the side wall 21a. The upper wall 21b has a holding groove 21c for holding a clip, to which the circular groove of the head portion 20a of the clip 20 is inserted and fixed. When the clip 20 is attached to the holding groove 21c, the side wall 21a, the upper wall 21b, the behind surface of a general portion of the reinforcement band 18, and the clip 20 configure a box-shaped section for achieving the excellent strength and stiffness. Further, since the side wall 21a of the clip base 21 intersects with the reinforcing rib 19 at a substantially right angle, the strength and the stiffness of both the side wall 21a and the rib 19 are enhanced.

In the above description, the clip base 21 is provided on the reinforcement piece 18C attached to the upper end flange 13c. However, the similar clip base 21 may be provided on the other reinforcement pieces 18A, 18B, 18D, or 18E in the same manner.

Further, in this embodiment, the reinforcement band 18 is almost entirely attached to the lining body 10 made of an unwoven fabric, along an end portion of the lining body 10. However, only at least a part of the reinforcement band 18 may be attached to the lining body 10 along the end portion of the lining body 10.

When this trunk side lining 1 according to this embodiment is attached to the vehicle body, firstly, a pillar garnish 2 is attached to the rear pillar, and then, the trunk side lining 1 is assembled with the vehicle body by aligning the upper end of the trunk side lining 1 with the lower end of the pillar garnish 2. At this time, the clip 20, which is attached to the reinforcement band 18 provided behind the lining body 10 via the clip base 21, is inserted into the corresponding attachment hole of the vehicle panel to fix the lining body 10.

When the trunk side lining 1 is attached to a vehicle body in this manner, only the unwoven fabric surface of the lining body 10 is exposed to the interior side of the vehicle. Therefore, an excellent texture can be obtained in the vehicle interior.

In the trunk side lining 1 according to this embodiment as described above, an entire area of the interior side surface of the lining body 10 is configured by the unwoven fabric, the reinforcement band 18 made of a rigid plastic is continuously attached to the behind surface of the end portion of the lining body 10, and the reinforcement band 18 includes the clip base 21 that holds the clip 20. Thus, there is no concern about exposing the head portion 20a of the clip 20 to the interior side, and wrong positioning of the clip 20. Further, it is not necessary to cover the end portion of the unwoven fabric with a pillar garnish 2. Therefore, employing the trunk side lining 1 of this embodiment, the vehicle weight can be reduced and the appearance from the interior side can be improved without deteriorating the appearance, deteriorating the stiffness of the attaching portion, leading to the wrong positioning, and subjecting the restriction of the overlapped portion of the pillar garnish.

Therefore, this trunk side lining 1 according to this embodiment can be widely and easily applicable to various portions of vehicles of various designs.

Further, in this trunk side lining 1, at least a part of the reinforcement band 18 made of a rigid plastic is attached to the behind surface of the lining body 10 along the end portion of the lining body 10. Therefore, the positioning of the clip base 21 can be accurately determined from the end portion of the lining body 10. Further, though the clip base 21 in the example shown in FIG. 3 is provided near the end portion of the lining body 10, the clip base 21 may be provided at a further inner area (center area) of the lining body 10. In such a case, by extending a part of the reinforcement band 18 to the inner area of the lining body 10, the positioning of the clip base 21 can be correctly determined.

Further, in the trunk side lining 1 according to this embodiment, the reinforcement band 18 is attached to the lining body 10 along the three-dimensionally curved surface, thus, the three-dimensional shape of the lining body 10 can be certainly maintained by the reinforcement band 18. Because the three-dimensional shape of the lining body 10 is certainly maintained, the assembling of the trunk side lining 1 becomes easy and the shape of the trunk side lining 1 after attached becomes stable, thereby maintaining an excellent texture.

Further, in the trunk side lining 1 according to this embodiment, the reinforcement band 18 is configured by reinforcement pieces 18A, 18B, 18C, 18D, and 18E. Thus, tools for forming the reinforcement band 18 can be miniaturized and simplified.

Further, in this embodiment, the reinforcement pieces 18A, 18B, 18C, 18D, and 18E are separated at flat portions that do not cross over the bent portion or curved portion of the lining body 10. Thus, with the separated structure which is advantageous in view of manufacturing, the lining body 10 can be effectively reinforced by the reinforcement pieces 18A, 18B, 18C, 18D, and 18E.

However, the separated structure is not necessarily employed for realizing the reinforcement band 18, that is, the reinforcement band may be continuously and integrally formed. In this case, the excellent stiffness of the reinforcement band 18 can be advantageously obtained, and the manufacturing cost can be reduced due to the reduced number of the parts.

Further, in this embodiment, the reinforcement band 18 is continuously formed with the clip base 21 having a box-shaped section. Thus, the stiffness of the reinforcement band 18 can be effectively improved due to the box-shaped section of the clip base 21.

Hereinbelow, modifications of the clip base 21 are explained with reference to FIGS. 6-8B.

Figure 6:
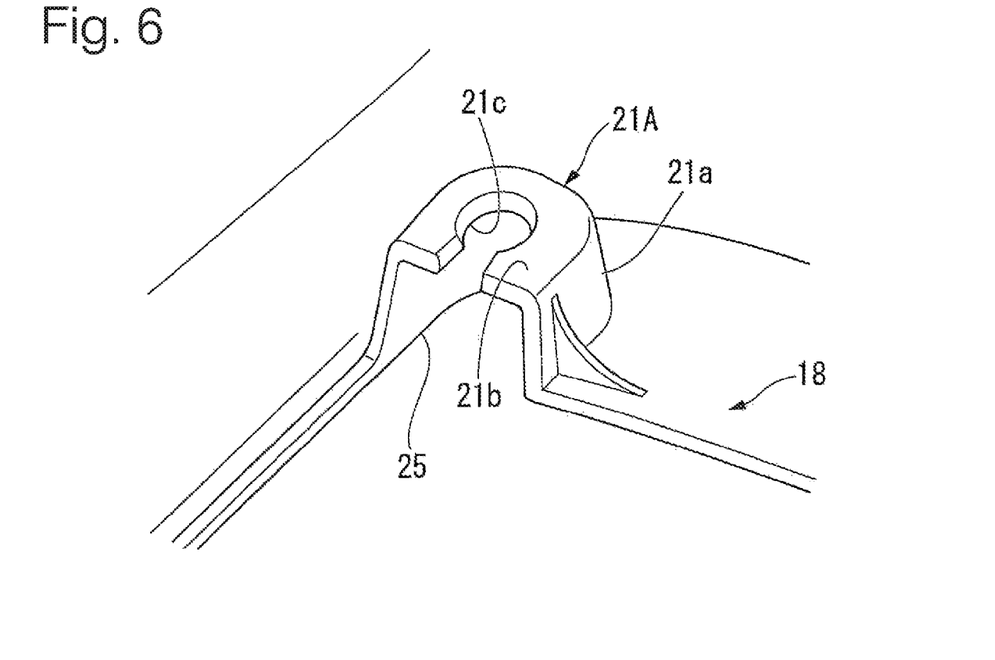
FIG. 6 is a partially enlarged perspective view of a reinforcement band according to a first modification.

FIG. 6 shows a clip base 21A which is a first modification of the clip base 21 (locking mechanism) of the reinforcing band 18.

The clip base 21 shown in FIG. 5 is configured to have a box-shaped section by a behind surface of a general portion of a reinforcement band 18, a substantially U-shaped side wall 21a, and an upper wall 21b. However, in the modified clip base 21A shown in FIG. 6, a substantially U-shaped opening 25 is formed in a general portion of the reinforcement band 18 along an inner surface of a side wall 21a.

In this modification, since the opening 25 is formed inside the side wall 21a and under the upper wall 21b, the clip base 21A can be obtained by forming tool without a sliding mechanism for removing a product from the forming tool. In addition, though this modified clip base 21A does not have a box-shaped section, this clip base 21A has a raised shape with respect to a general portion of the reinforcement band 18, and this contributes to the improvements of the stiffness and the strength of the reinforcement band 18.

Figure 7:
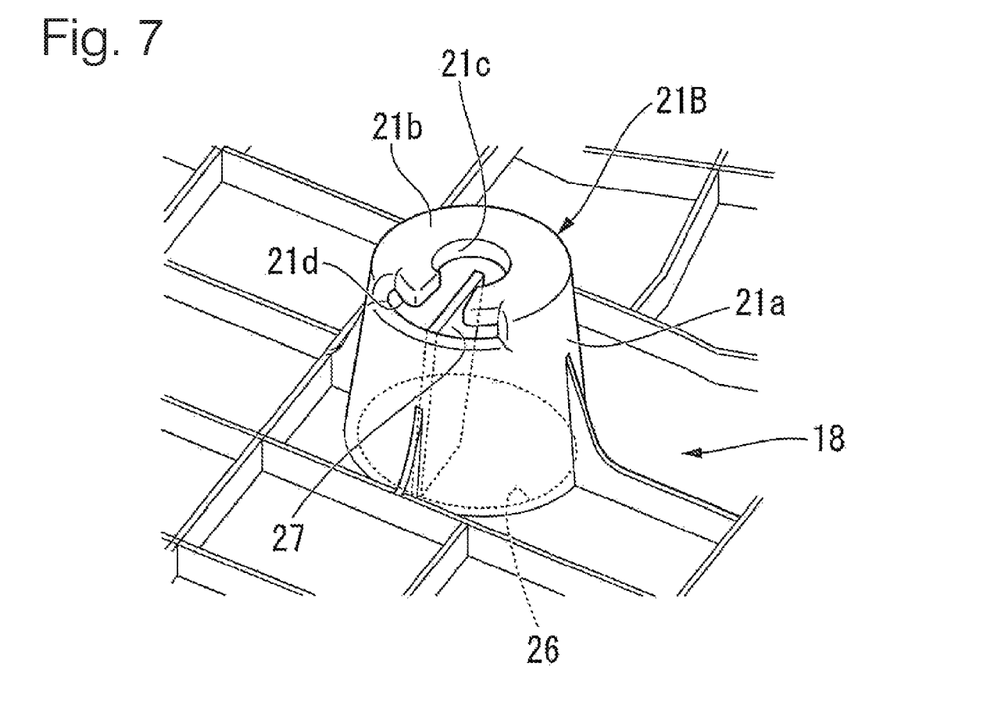
FIG. 7 is a partially enlarged perspective view of a reinforcement band according to a second modification.

FIG. 7 shows a clip base 21B which is a second modification of the clip base 21.

This modified clip base 21B has a side wall 21a having a cylindrical shape, an upper wall 21b that includes a holding groove 21c for holding a clip. The side wall 21a includes, at the upper end corner thereof, a cut-out portion 21d continuing to the holding groove 21c into which the clip is inserted. In this modification, a circular-shaped opening 26 is formed in a general portion of the reinforcement band 18 along an inner surface of the cylindrically-shaped side wall 21a. Note that, in this example, since a projecting rib 27 is provided at an inner surface of the side wall 21a so as to support a head portion of the clip, the opening 26 actually does not have an accurate circular shape.

In this modification, the clip base 21B also can be easily obtained by a forming tool without a sliding mechanism for removing a product from the forming tool. In addition, this clip base 21B also has a raising shape, thus, this contributes to the improvements of the stiffness and the strength of the reinforcement band 18.

Figure 8A:
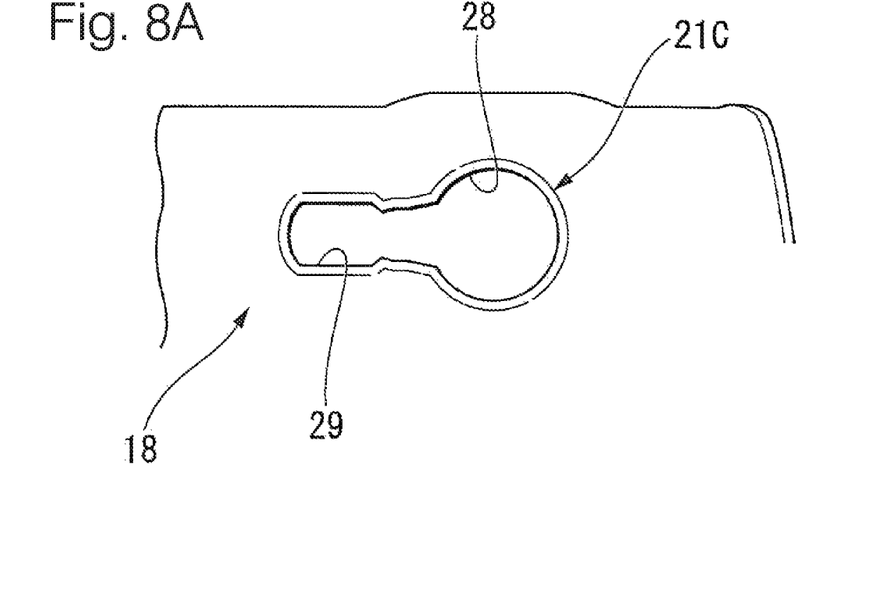
FIG. 8A is a front view of a reinforcement band according to a third modification.
Figure 8B:
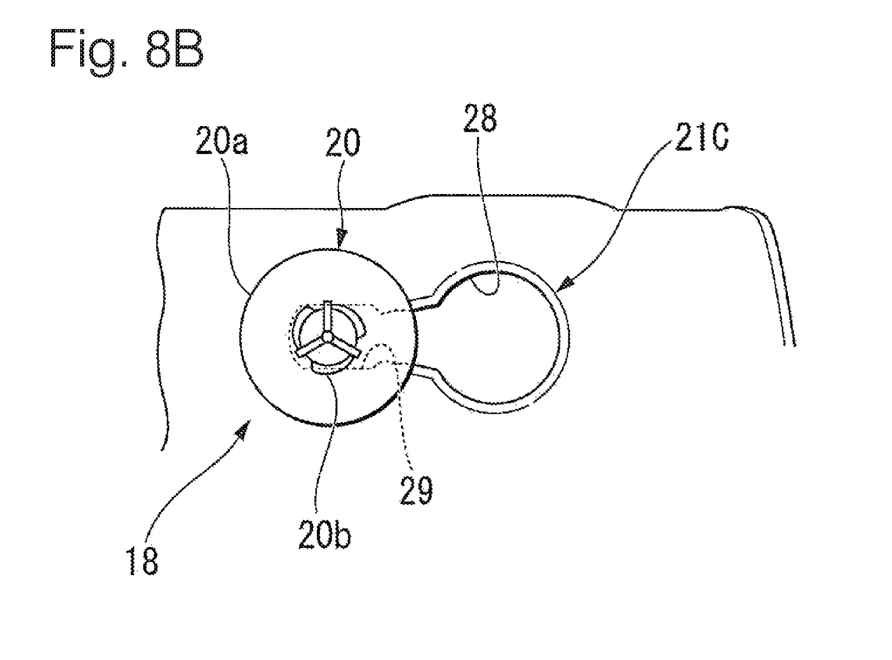
FIG. 8B is a front view of the reinforcement band including a clip attached thereto.

FIG. 8A and FIG. 8B show a clip base 21C which is a third modification of the clip base 21. FIG. 8A shows the clip base 21C not including a clip 20, and FIG. 8B shows the clip base 21C including the clip 20.

This modified clip base 21C does not have a raising portion such like a side wall, but has a clip inserting hole 28 with the hole diameter larger than the diameter of the head portion 20a of the clip 20, and a holding groove 29 which holds the clip 20, at the general portion of the reinforcement band 18. The clip 20 can be fixed to the clip base 21C by inserting the head portion 20a of the clip 20 into the clip inserting hole 28, and sliding the clip 20 toward the holding groove 29, so as to hold the head portion 20a with the holding groove 29.

In the above description, the clip base is integrally formed with the reinforcement band not together with a clip. However, the clip may be integrally formed with the reinforcement band.

(Second Embodiment)

Figure 9:
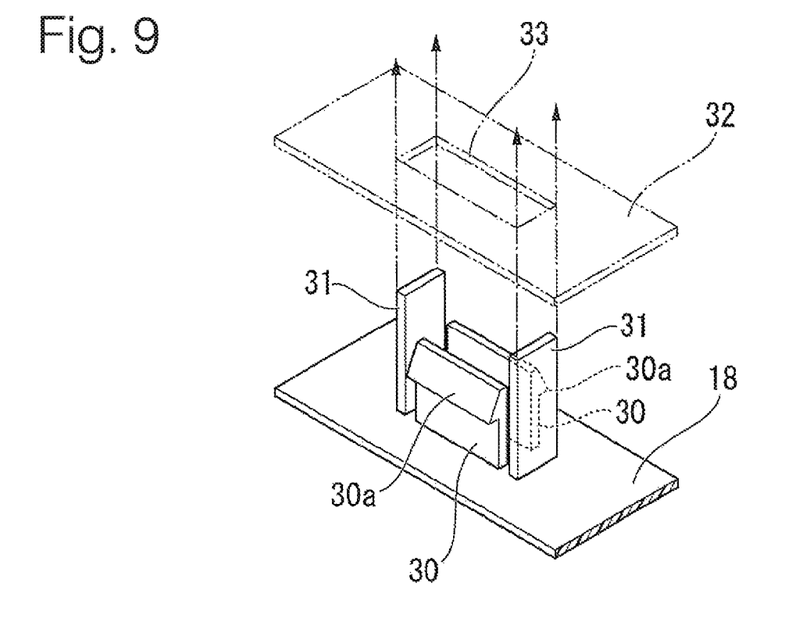
FIG. 9 is a partially enlarged perspective view of a reinforcement band of the vehicle interior member according to a second embodiment of the present invention.

FIG. 9 shows a second embodiment of the present invention.

This embodiment differs from the first embodiment in the configuration of the locking mechanism employed in the reinforcement band 18. That is, in this embodiment, the locking mechanism is configured by a pair of latches 30, 30 each having a removal preventing projection 30a, and a pair of guide walls 31, 31, which are integrally formed behind the reinforcement band 18. These latches 30, 30 and the guide walls 31, 31 are provided so as to be inserted into an attachment hole 33 having a substantially rectangular shape provided on a bracket 32 or the like of the vehicle body.

(Third Embodiment)

Figure 10:
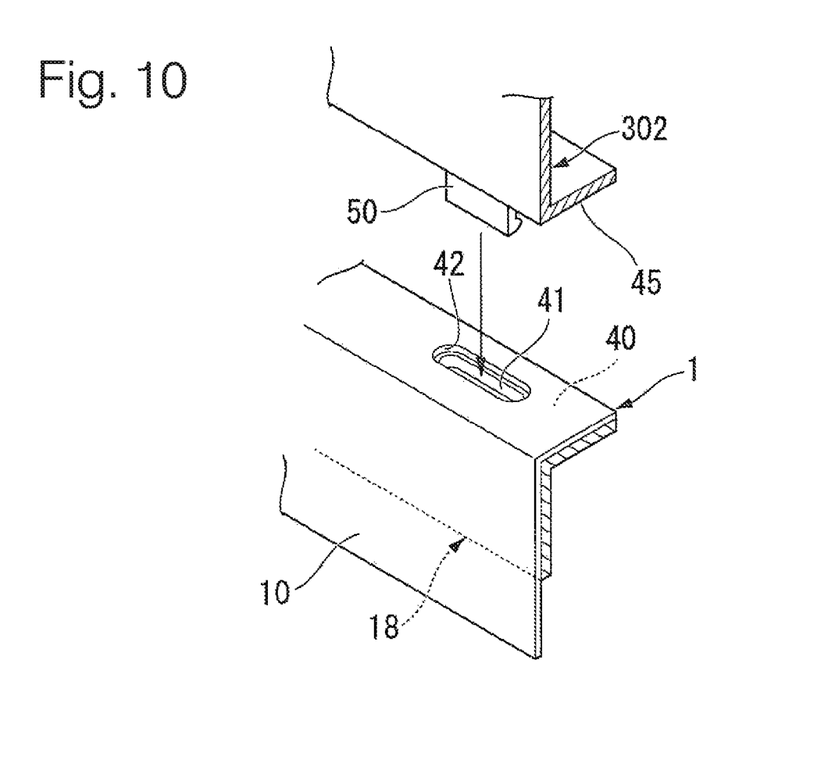
FIG. 10 is a perspective view of a positioning-fitting portion of a vehicle interior member and a pillar garnish according to a third embodiment of the present invention.

FIG. 10 shows a third embodiment of the present invention.

The trunk side lining 1 according to this embodiment has a substantially L-shaped bent wall 40 including a first plane and a second plane at an end portion of the reinforcement band 18 provided on the behind surface of the lining body 10. The second plane faces an end wall 45 (lower wall) of the pillar garnish 302 (external member). The bent wall 40 has an oblong fitting hole 41 (positioning-fitting portion) on the second plane. The bent wall 40 is overlapped by an end portion of the lining body 10, and in the lining body 10, an inserting hole 42 is formed at a position corresponding to the fitting hole 41 formed on the second plane of the bent wall 40. This inserting hole 42 has a size slightly larger than the fitting hole 41. These inserting hole 42 of the lining body 10 and the fitting hole 41 of the bent wall 40 are provided so that a latch 50 provided on the end wall 45 of the pillar garnish 302 is inserted thereinto at the time of assembling the trunk side lining 1 with the vehicle body.

In this embodiment, since the fitting hole 41 into which the latch 50 of the pillar garnish 302 is inserted is provided at the end portion of the rigid plastic reinforcement band 18, it is possible to achieve accurate alignment of the trunk side lining 1 and the pillar garnish 302, thereby improving the appearance of the vehicle interior.

Note that, in this embodiment, the fitting hole 41 is provided on the reinforcement band 18 and the latch 50 is provided on the pillar garnish 302, but in an opposite manner, the fitting hole 41 may be provided on the pillar garnish 302 and the latch 50 may be provided on the reinforcement band 50.

(Fourth Embodiment)

Figure 11:
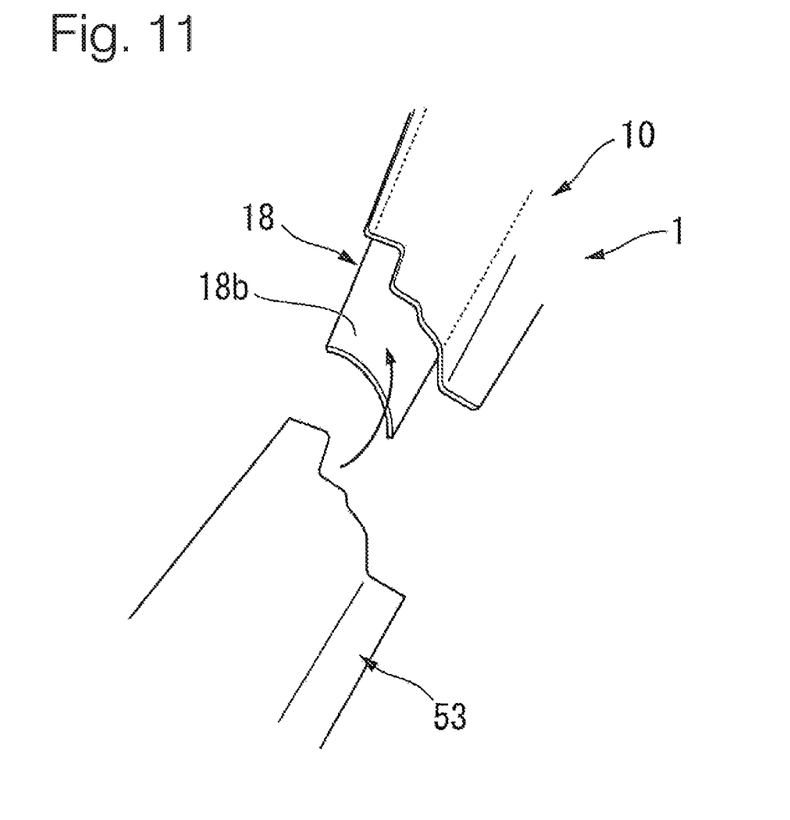
FIG. 11 is an exploded perspective view of an overlapping portion of a vehicle interior member and a floor side garnish according to a fourth embodiment of the present invention.

FIG. 11 shows a fourth embodiment of the present invention.

In the trunk side lining 1 according to this embodiment, the end portion in the longitudinal direction (extending direction) of the reinforcement band 18 attached to the behind surface of the lining body 10 is extended beyond the end portion of the lining body 10. Then, the surface of the region 18b of the reinforcement band 18 which extends from the end portion of the lining body 10 is overlapped by the floor side garnish 53.

In this embodiment, since the reinforcement band 18 having an excellent stiffness is extended from the end portion of the lining body 10 and the surface of the extended reinforcement band 18 is overlapped by the floor side garnish 53, the positioning of the trunk side lining 1 and the floor side garnish 53 can be accurately and easily determined. Further, it is possible to impart a sufficient stiffness to the connecting portion of the trunk side lining 1 and the floor side garnish 53.

In addition, if an unwoven fabric member, a rigid plastic member, and a garnish are exposed to the vehicle interior side such as a related art, two border lines are formed therebetween and are visible from the interior side. However, in this trunk side lining 1 of this embodiment, since the region 18b of the reinforcement band 18 is entirely covered by the garnish 53 after the lining body 10 is assembled with the vehicle body, only one borderline formed between the garnish 53 and the lining body 10 is visible from the interior side. Therefore, the manufacturing and the assembling of the trunk side lining 1 can be simplified without deteriorating the appearance of the vehicle interior.

Note that the present invention is not limited only to the above-described embodiments, and the various modified configurations are possible in the scope of not beyond the gist. For example, the above embodiments are explained using a trunk side lining as an example of a vehicle interior member, but the vehicle interior member of the present invention is not limited to the trunk side lining. Another vehicle interior member, such like a tale gate lining (rear door lining) may be used as the vehicle interior member as well.

In addition, the reinforcement band 18 of the above embodiments are formed to have a substantially constant width, but depending on the design of an interior member or a vehicle body, the reinforcement member having a triangular shape or a circular shape may be used.

What is claimed is:

1. A vehicle interior member that is attached to an interior side of a vehicle body, comprising:

an interior member body which is made of an unwoven fabric, the interior member body having a circumferential portion, a front surface exposed to the vehicle interior, and a rear surface that is invisible from the vehicle interior side; and a reinforcement band which is made of a rigid plastic and attached to the rear surface of the interior member body, the reinforcement band being provided with a locking mechanism that fixes the interior member body to the vehicle body;

wherein at least a part of the reinforcement band is attached only to the circumferential portion of the rear surface of the interior member body.

2. The vehicle interior member according to claim 1, wherein:

the interior member body has a three-dimensionally curved surface that is three-dimensionally bent or curved near the circumferential portion of the interior member body; and the reinforcement band is attached to the rear surface of the interior member body along the three-dimensionally curved surface.

3. The vehicle interior member according to claim 1, wherein the reinforcement band includes a plurality of reinforcement pieces.

4. The vehicle interior member according to claim 3, wherein the circumferential portion of the interior member body includes one or more flat portions; and the plurality of reinforcement pieces are arranged at flat portions that do not cross over a bent portion or a curved portion of the interior member body.

5. The vehicle interior member according to claim 1, wherein the reinforcement band is continuously formed.

6. The vehicle interior member according to claim 1, wherein the locking mechanism is a clip base that holds a clip attached to the vehicle body.

7. The vehicle interior member according to claim 1, wherein the reinforcement band is provided with a positioning-fitting portion; further comprising an additional interior member body attached to the positioning-fitting portion.

* * * * *